US008928347B2

(12) United States Patent
Gotze et al.

(10) Patent No.: US 8,928,347 B2
(45) Date of Patent: Jan. 6, 2015

(54) INTEGRATED CIRCUITS HAVING ACCESSIBLE AND INACCESSIBLE PHYSICALLY UNCLONABLE FUNCTIONS

(71) Applicant: Intel Corporation, Santa Clara, CA (US)

(72) Inventors: Kevin C. Gotze, Hillsboro, OR (US); Gregory M. Iovino, Portland, OR (US); Jiangtao Li, Beaverton, OR (US); David Johnston, Hillsboro, OR (US); Sanu K. Mathew, Hillsboro, OR (US); George W. Cox, Lake Oswego, OR (US); Anand Rajan, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 95 days.

(21) Appl. No.: 13/631,634

(22) Filed: Sep. 28, 2012

(65) Prior Publication Data

US 2014/0091832 A1    Apr. 3, 2014

(51) Int. Cl.
*H03K 19/00* (2006.01)
*H03K 19/003* (2006.01)

(52) U.S. Cl.
CPC .................... *H03K 19/003* (2013.01)
USPC .................................. 326/8; 380/45

(58) Field of Classification Search
USPC .................................. 326/8; 380/45
See application file for complete search history.

(56) References Cited

U.S. PATENT DOCUMENTS

| 8,525,549 | B1* | 9/2013 | Feng et al. ................. 326/38 |
| 2009/0083833 | A1* | 3/2009 | Ziola et al. ................. 726/2 |
| 2010/0085075 | A1* | 4/2010 | Luzzi et al. ................. 326/8 |
| 2010/0127822 | A1 | 5/2010 | Devadas |
| 2011/0055649 | A1 | 3/2011 | Koushanfar et al. |
| 2012/0126840 | A1 | 5/2012 | Lee et al. |
| 2012/0137137 | A1 | 5/2012 | Brickell et al. |
| 2013/0142329 | A1* | 6/2013 | Bell et al. ................. 380/44 |
| 2013/0147511 | A1 | 6/2013 | Koeberl et al. |
| 2014/0032933 | A1 | 1/2014 | Smith et al. |
| 2014/0089659 | A1 | 3/2014 | Brickell et al. |
| 2014/0093074 | A1* | 4/2014 | Gotze et al. ................. 380/45 |
| 2014/0095867 | A1 | 4/2014 | Smith et al. |
| 2014/0201540 | A1 | 7/2014 | Li et al. |

FOREIGN PATENT DOCUMENTS

WO    2014/051741 A2    4/2014

OTHER PUBLICATIONS

International Search Report received for PCT Patent Application No. PCT/US2013/045517, mailed on Jul. 18, 2014, 3 pages.

* cited by examiner

*Primary Examiner* — Jason M Crawford
(74) *Attorney, Agent, or Firm* — Vecchia Patent Agent, LLC

(57) ABSTRACT

An integrated circuit substrate of an aspect includes a plurality of exposed electrical contacts. The integrated circuit substrate also includes an inaccessible set of Physically Unclonable Function (PUF) cells to generate an inaccessible set of PUF bits that are not accessible through the exposed electrical contacts. The integrated circuit substrate also includes an accessible set of PUF cells to generate an accessible set of PUF bits that are accessible through the exposed electrical contacts. Other apparatus, methods, and systems are also disclosed.

18 Claims, 15 Drawing Sheets

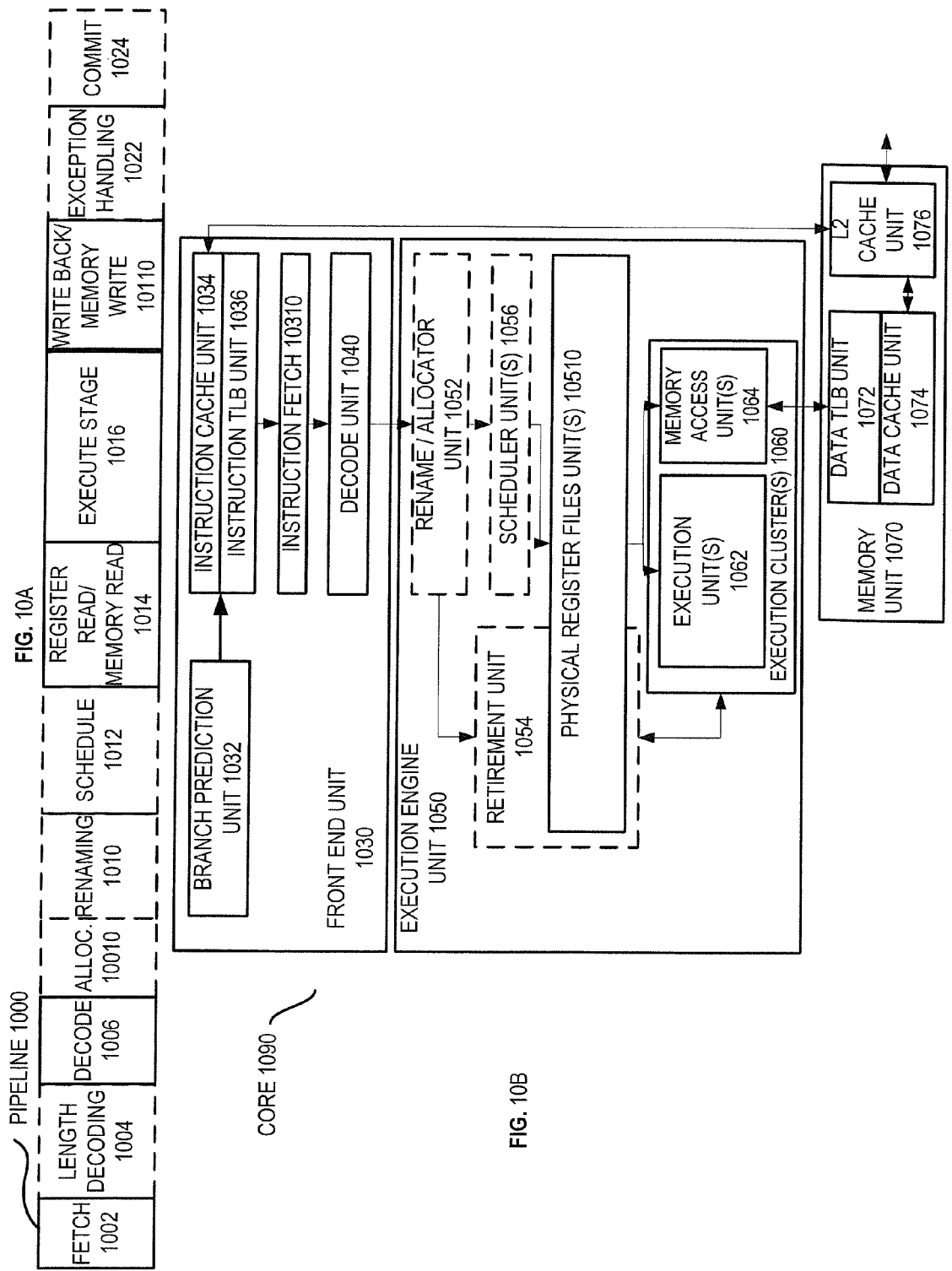

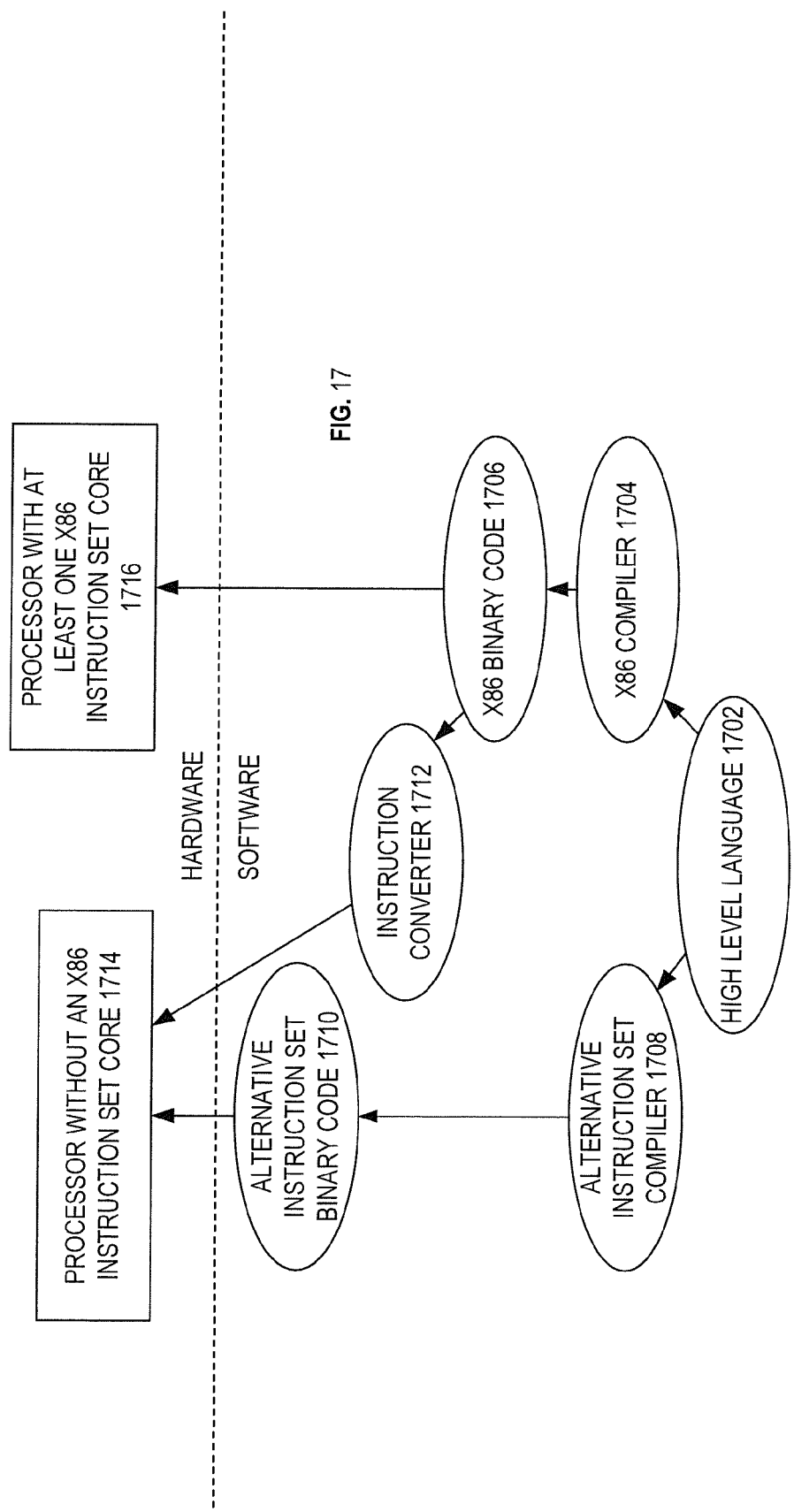

INTEGRATED CIRCUITS HAVING ACCESSIBLE AND INACCESSIBLE PHYSICALLY UNCLONABLE FUNCTIONS

BACKGROUND

1. Field

Embodiments relate to integrated circuits. In particular, embodiments relate to integrated circuits having Physically Unclonable Functions (PUFs).

2. Background Information

Computers, cell phones, multimedia content players, and various other types of electronic devices, are commonly used to handle sensitive or secure information (e.g., financial information, confidential documents, personal emails, digital rights protected content, etc.). Integrated circuits used in such electronic devices are commonly provisioned with one or more secrets, such as one or more secure keys, that are used to protect the sensitive or secure information. The secure keys may be used to protect the sensitive or secure information in various ways, such as through encryption/decryption, authentication, digital signatures, and other known cryptographic approaches.

One way to provision the integrated circuits with the secure keys is to program or store the secure keys in fuses and/or memory (e.g., various types of read-only memory (ROM)) in a digital form. However, one drawback with such an approach is that the secure keys stored in the memory and/or fuses in digital form tend to be somewhat vulnerable to discovery. Although the secure keys generally cannot be read out directly, invasive attacks and/or reverse engineering may be used to obtain the secure keys. Allowing the secure keys to be obtained may breach, or at least contribute to breaching, the security of the sensitive information. Additionally, such provisioning of secret cryptographic keys oven means that they are exposed to some part of a manufacturer's key generation, device design, and manufacturing infrastructures.

Physically Unclonable Functions (PUFs) provide an alternative to storing secure keys in memory and/or fuses in digital form. One advantage to the use of PUFs for security is that the PUFs tend to be significantly less vulnerable to discovery than the secure keys stored in memory and/or fuses in digital form. The PUFs may be used to generate PUF bits during runtime which may be used for security. The PUFs bits are typically characterized by a PUF bit error level and a PUF bit entropy level.

BRIEF DESCRIPTION OF THE SEVERAL VIEWS OF THE DRAWINGS

The invention may best be understood by referring to the following description and accompanying drawings that are used to illustrate embodiments of the invention. In the drawings:

FIG. 10A is a block diagram illustrating both an exemplary in-order pipeline and an exemplary register renaming, out-of-order issue/execution pipeline according to embodiments of the invention.

FIG. 10B is a block diagram illustrating both an exemplary embodiment of an in-order architecture core and an exemplary register renaming, out-of-order issue/execution architecture core to be included in a processor according to embodiments of the invention.

FIG. 17 is a block diagram contrasting the use of a software instruction converter to convert binary instructions in a source instruction set to binary instructions in a target instruction set according to embodiments of the invention.

DETAILED DESCRIPTION

In the following description, numerous specific details, such as specific types of PUF cells, locations of PUF cells, logic partitioning/integration details, types and interrelationships of components, and the like, are set forth. However, it is understood that embodiments of the invention may be practiced without these specific details. In other instances, well-known circuits, structures and techniques have not been shown in detail in order not to obscure the understanding of this description.

Figure 1:
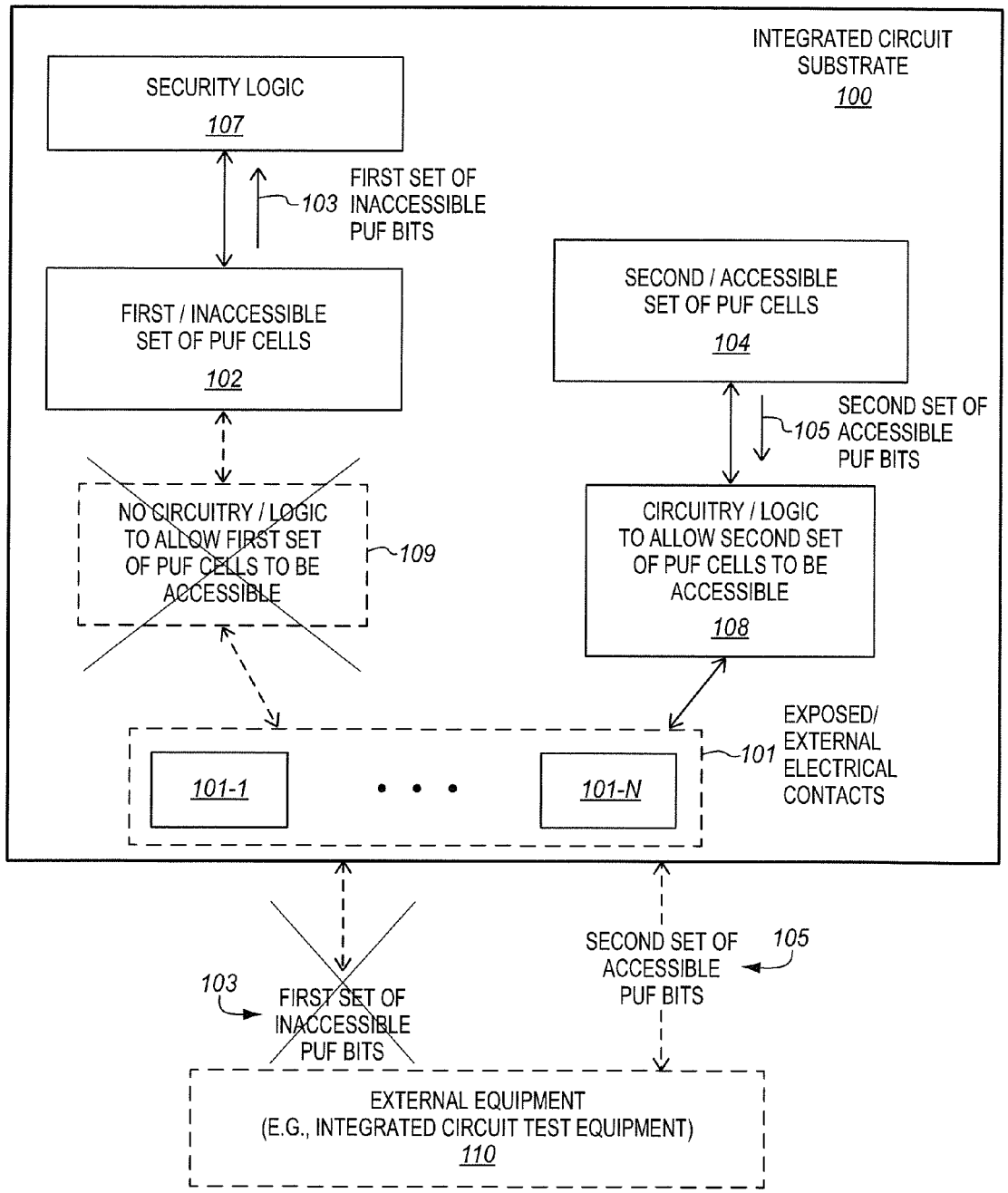
FIG. 1 is a block diagram of an embodiment of an integrated circuit substrate having exposed and/or external electrical contacts, a first inaccessible set of PUF cells and a second accessible set of PUF cells.

FIG. 1 is a block diagram of an embodiment of an integrated circuit substrate 100 having exposed and/or external electrical contacts 101, a first inaccessible set of Physically Unclonable Function (PUF) cells 102 to generate a first set of inaccessible PUF bits 103, and a second accessible set of PUF cells 104 to generate a second set of accessible PUF bits 105. The first inaccessible set of PUF cells and/or the first set of inaccessible PUF bits are inaccessible through the electrical contacts. The second accessible set of PUF cells and/or the second set of accessible PUF bits are accessible through the electrical contacts.

The first and second sets of PUF cells 102, 104 may be any of a wide variety of different types of PUF cells known in the arts. PUFs are sometimes also known in the arts as physical one-way functions (POWFs). It tends to be difficult to place a precise circumference around all of the different types of devices, circuitry, and physical systems that are PUFs. This discussion is not intended, and should not be used, to exclude devices, circuitry, and physical systems that regarded to be PUFs. Most PUFs generally represent functions (e.g., they produce an output from an input), which are physical (e.g., integrated circuitry, structures or micro-structures, devices, materials, embodied in a physical medium, etc.), which are substantially hard to predict (for the particular intended use), and which are substantially unclonable. Substantially unclonable means that it would be extremely difficult (if not infeasible), even for the manufacturer of a given PUF, to manufacture a copy of the given PUF that would provide the same output for the same input, even using the same manufacturing process. This is largely due to the general nature of the PUFs and the uncontrollable process variations encountered during the manufacturing process.

The first inaccessible set of PUF cells 102 may generate the first inaccessible set of PUF bits 103 as a response or output to a challenge or input. Likewise, the second accessible set of PUF cells 104 may generate the second accessible set of PUF bits 105 as a response or output to a challenge or input. Some types of PUF cells may not need a challenge or input but rather may provide or deliver readable values. By way of example, the challenge may include one or more electrical signals applied to the PUF cells. The PUF bits are not merely non-volatile bits programmed or stored in fuses or memory in a digital form, but rather may be generated during runtime, and may in some cases only exist when the integrated circuit is powered on. In this way, the first inaccessible set of PUF bits may be significantly less susceptible to discovery than non-volatile bits stored in fuses or memory. The particular binary values of the first and second sets of PUF bits generated by the first and second sets of PUF cells generally depend upon the physical characteristics of the corresponding PUF cells, which in turn depend on the particular manufacturing process used to manufacture the corresponding PUF cells, as well as the uncontrollable process variations encountered during the manufacturing process which are impractical to reproduce. For example, in the case of silicon PUF cells, the particular binary values of the PUF bits generated may depend upon parameters such as line widths of integrated circuits, dopant concentrations in semiconductor materials, or the like, which depend in an unpredictable way upon manufacturing process variations.

In some embodiments, the first and second sets of PUF cells may represent silicon intrinsic PUF cells or more generally semiconductor intrinsic PUF cells. In some embodiments, the first and second sets of PUF cells may have been manufactured using a complementary metal oxide semiconductor (CMOS) manufacturing process that is also used to manufacture transistors of the integrated circuit. Examples of suitable types of PUFs include, but are not limited to, delay PUFs (e.g., intrinsic PUFs based on digital delay measurements), delay loop PUFs, memory PUFS (e.g., intrinsic PUFs based on settling state of digital memory elements), SRAM PUFs, cross-coupled PUFs, arbiter PUFs (e.g., PUFs based on MUXes and an arbiter), ring-oscillator PUFs, bistable ring PUFs, butterfly PUFs, latch PUFs, flip-flop PUFs, D-type flip-flop PUFs, coating PUFs, and additional semiconductor or CMOS PUFs known in the arts. As will be discussed further below, in some embodiments, the second accessible set of PUF bits may be analyzed in order to infer, estimate, or predict properties of the first inaccessible set of PUF bits. In one aspect, this may be done by a manufacturer as an indirect way to monitory the properties of the inaccessible PUF bits (e.g., to verify that the inaccessible PUF bits are sufficient for their intended use). That is, the accessible PUF bits may be used to indirectly debug or validate the inaccessible PUF bits. In such embodiments, it is generally beneficial if the first and second sets of PUF cells are similar (e.g., of a same type, design, and size). This generally helps to ensure that the properties of the second accessible set of PUF cells determined through analysis are relevant to those of the first inaccessible set of PUF cells.

The number of the first inaccessible set of PUF cells may be any conventional or appropriate number without limitation to the scope of the invention. Commonly, in the case of a relatively highly secured general-purpose processor, there may be anywhere from hundreds to many thousands of the first inaccessible set of PUF cells. In various embodiments, there may be anywhere from tens, to hundreds, to several thousand of the second accessible set of PUF cells. When the second accessible PUF bits are analyzed to estimate properties, often a number ranging from about 128 to 1024, or from about 256 to 512, will be sufficient, although the scope of the invention is not limited to these particular numbers. Generally, the greater the number of the accessible PUF bits available for analysis the better the analysis results (at least to a point). Conversely, the fewer the accessible PUF bits the smaller the cost, area/footprint, and power consumption. Accordingly, there is a tradeoff between analysis accuracy and implementation cost such that the appropriate number generally depends upon the objectives of the particular implementation.

Referring again to FIG. 1, the first set of inaccessible PUF bits 102 may be used for security within the integrated circuit substrate. The first set of inaccessible PUF cells may provide the first set of inaccessible PUF bits 103 to security logic 107. In some embodiments, the security logic may include key generation and/or derivation logic to generate and/or derive one or more secrets or secure keys from the first set of inaccessible PUF bits 103 using cryptographic key generation and/or derivation algorithms. By way of example, the security logic may include, but is not limited to, a cryptographic module or circuit, a crypto-processor, a crypto-coprocessor, a trusted platform module, a security engine, a security controller, or the like.

Referring again to FIG. 1, the integrated circuit substrate also includes the set of exposed and/or external electrical contacts 101. In the illustrated embodiment, a first electrical contact 101-1 through an Nth electrical contact 101-N are shown, where N may be any appropriate number, often on the order ranging from tens to hundreds. Integrated circuit substrates generally include exposed and/or external electrical contacts to interact with external electrical signaling medium (e.g., a circuit board, component of an electrical device, manufacturing test equipment, etc.). Power is often delivered to the integrated circuit substrate through certain of the electrical contacts, and electrical signals are exchanged between the external electrical signaling medium and the integrated circuit substrate through other of the electrical contacts. The exposed and/or external electrical contacts are electrically coupled with the integrated circuitry of the integrated circuit substrate through interconnects of the integrated circuit substrate. The exposed and/or external electrical contacts are accessible from an outside of the integrated circuit substrate (e.g., reside on the outside surface of the integrated circuit substrate). By way of example, in various embodiments, the exposed or external electrical contacts may represent pads, bumps, solder material, pins, or other types of electrical contacts that are accessible from outside the integrated circuit or package and that are electrically coupled with the interconnects and/or integrated circuitry of the integrated circuit. When incorporated in a package, the exposed or external electrical contacts may be accessed through corresponding electrical contacts of the package.

Also shown in the illustration is external equipment 110 (i.e., external to the integrated circuit substrate). In one aspect, the external equipment may represent integrated circuit test and/or debug equipment (e.g., a tester and prober) and/or other integrated circuit manufacturing equipment. During the manufacture of integrated circuits, it is common to test integrated circuits and integrated circuit packages at various stages of manufacture. This may be done for various purposes, such as, for example, to test or debug the integrated circuit substrate, to test for proper operation, to detect defects, to sort properly functioning integrated circuits from improperly functioning integrated circuits that are to be discarded or reworked, to program data based on testing into the integrated circuit, etc. The external equipment may be operable to couple with the exposed or external electrical contacts of the integrated circuit. For example, the external equipment may have a set of electrical probes that may be used to contact the electrical contacts of the integrated circuit substrate. The external equipment may exchange electrical signals with the integrated circuit substrate through the probes and electrical contacts according to a test pattern. For example, the integrated circuit test equipment may transmit electrical signals to the integrated circuit, and receive corresponding electrical signals in response, which may be analyzed as part of testing. With the aim of integrated circuit security in mind, there is a security risk posed by malicious or attacker external equipment. For example, an integrated circuit test and/or debug equipment at a manufacturing facility may be corrupted by employees secretly installing malicious software to obtain secrets, keys, or PUF bits. Moreover, attackers may create their own external equipment to attempt to access secrets, keys, or PUF bits through the external contacts. In some embodiments, the inaccessible PUF bits may also be unavailable inside the device to all but highly trusted and/or highly privileged logic. In such embodiments, the inaccessible PUF bits may not be accessible to untrusted or unprivileged software (e.g., user software or malicious software), such as, for example, inaccessible to all but the highest level of privileged software.

Referring again to FIG. 1, the integrated circuit substrate includes the first inaccessible set of PUF cells 102 to generate the first set of inaccessible PUF bits 103, and the second accessible set of PUF cells 104 to generate the second set of accessible PUF bits 105. The first inaccessible set of PUF cells and/or the first set of inaccessible PUF bits are inaccessible through the electrical contacts. The second accessible set of PUF cells and/or the second set of accessible PUF bits are accessible through the electrical contacts.

In some embodiments, the integrated circuit substrate may omit or lack circuitry or other logic 109 to allow the first inaccessible set of PUF bits and/or the first inaccessible set of PUF cells to be accessible through the exposed and/or external electrical contacts. For example, there may be no lines, wires, or other interconnects and/or logic to allow the inaccessible set of PUF bits to be accessed through the contacts. In some embodiments, the integrated circuit design may not allow scan or debug of the inaccessible PUF bits, or at least may more highly restrict such scan or debug, which helps to render them inaccessible. In some embodiments, there may similarly be no lines, wires, or other interconnects and/or logic to allow an untrusted entity within the integrated circuit (e.g., application or other untrusted software) to access the inaccessible PUF Bits. In some cases, the inaccessible PUF bits may potentially be observable only as a result of a change in output of a sufficiently strong cryptographic function to which the PUF cells are input, but the cryptographic function may be sufficiently strong that the PUF bits for all practical purposes cannot be determined. This may prevent the external equipment from being able to read, obtain, or otherwise access the first inaccessible set of PUF bits and/or the first inaccessible set of PUF cells. Advantageously, preventing the external equipment from being able to access the first inaccessible set of PUF bits and/or the first inaccessible set of PUF cells may help to enhance the security of the integrated circuit substrate. If instead the external equipment were able to access the first set of PUF bits, there is an increased likelihood that the first set of inaccessible PUF bits, which as described above are used for security within the integrated circuit substrate, would be discovered by corrupted manufacturing test/debug equipment or attacker equipment. This could potentially compromise, or at least contribute to compromising, the security of the integrated circuit substrate. However, by preventing the external equipment from accessing the first inaccessible set of PUF cells and/or the first inaccessible set of PUF bits, such risks may be significantly reduced. An additional advantage is that the manufacturer may not be able to access and/or know the binary values of the first inaccessible set of PUF bits. This may help to reduce the responsibilities (e.g., the responsibilities to keep them secret) and/or liabilities (e.g., in the event they were discovered and made public) of the manufacturer.

In contrast, in some embodiments, the integrated circuit substrate may include circuitry or other logic 108 to allow the second accessible set of PUF bits and/or the second accessible set of PUF cells to be accessible through the exposed and/or external electrical contacts. This may allow the external equipment to be able to read, obtain, or otherwise access the second accessible set of PUF bits and/or the second accessible set of PUF cells. For example, the second accessible set of PUF bits may be transmitted or provided from the integrated circuit to the external equipment over the exposed or external electrical contacts as electrical signals. In some embodiments, as will be explained further below, the second accessible set of PUF bits may be analyzed in conjunction with determining characteristics or attributes, such as, for example, a PUF bit error level and/or a PUF bit entropy level. The PUF bit entropy level may be determined through comparison of PUF bits from other different integrated circuits or integrated circuit substrates. In some embodiments, the analysis may be performed across multiple or potentially numerous different integrated circuits (e.g., at least one hundred, at least one thousand, tens of thousands, or even more). In some embodiments, the characteristics or attributes (e.g., the PUF bit error level and/or the PUF bit entropy level) of the first inaccessible set of PUF bits and/or the first inaccessible set of PUF cells may be inferred or estimated from characteristics or attributes of the second accessible set of PUF bits determined through the analysis. Since the first and second sets of PUF cells were manufactured on the same integrated circuit substrate, at the same time, and encountered substantially the same manufacturing process variations, they should have the same, or at least sufficiently similar, PUF cell and/or PUF bit characteristics or attributes. Advantageously, this may allow the characteristics or attributes of the first inaccessible set of PUF bits and/or the first inaccessible set of PUF cells to be estimated or inferred without needing to make them accessible or ever even needing to know these PUF bits. The estimates of the characteristics or attributes of the first inaccessible set of PUF bits and/or the first inaccessible set of PUF cells are useful for various purposes, such as, for example, to allow estimation, evaluation, or verification of the level of security, to assist with design or redesign of security related logic, for quality control purposes, to adjust the amount of control over process variation in the manufacturing process, etc.

The integrated circuit substrate 100 may represent a wafer, a singulated die, or other integrated circuit substrate. In other embodiments the integrated circuit substrate may include a processor. In some embodiments, the processor may be a general-purpose processor. In other embodiments, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers), to name just a few examples. The processor may be any of various complex instruction set computing (CISC), reduced instruction set computing (RISC), very long instruction word (VLIW) processors, hybrids thereof, or other types of processors. In other embodiments, the integrated circuit substrate may include a chipset component. For example, the integrated circuit substrate may include an input/output controller, a memory controller, a graphics chip, or the like. Alternatively, the integrated circuit substrate may include other types of integrated circuits known in the arts (e.g., an Application Specific Integrated Circuit (ASIC), a System-on-Chip (SoC), etc.). In still further embodiments, the integrated circuit substrate may be replaced by a secure key card, smart card, or other type of apparatus or device for which security with PUFs is desired.

Figure 2:
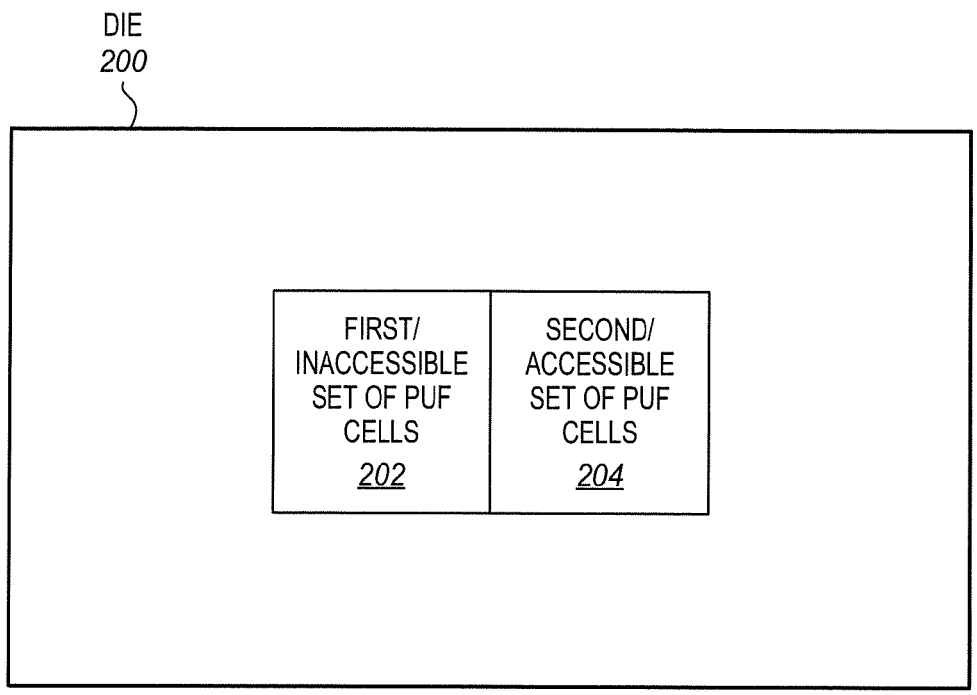
FIG. 2 is a block diagram of an embodiment of a die having a first inaccessible set of PUF cells and a second accessible set of PUF cells in close proximity.
Figure 3:
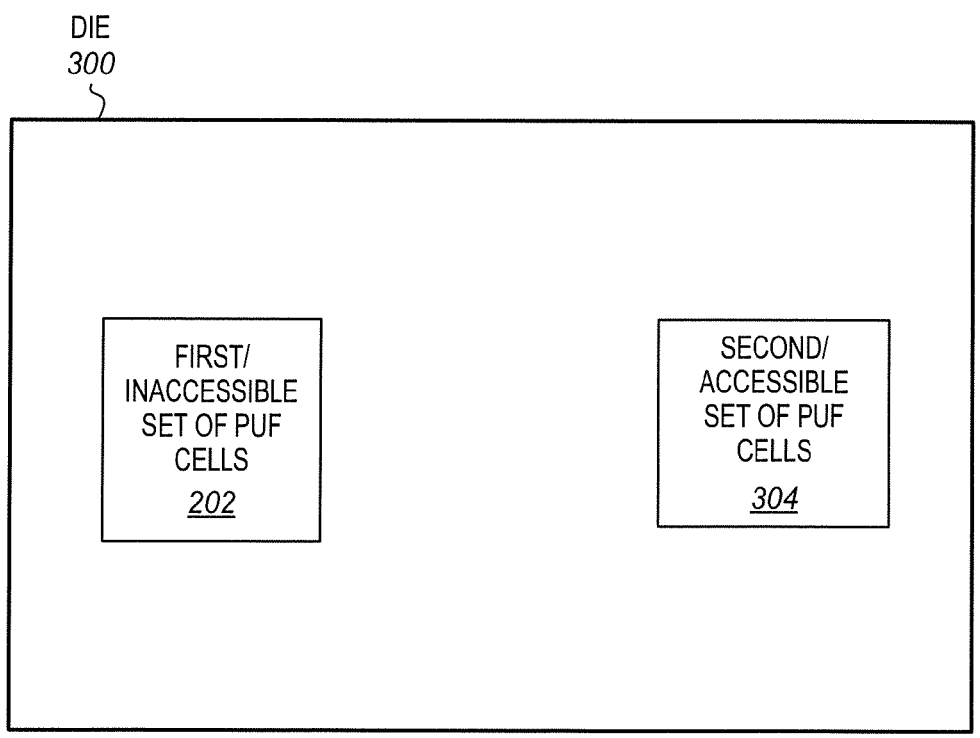
FIG. 3 is a block diagram of an embodiment of a die having a first inaccessible set of PUF cells and a second accessible set of PUF cells that are physically separated from one another on the die.
Figure 4:
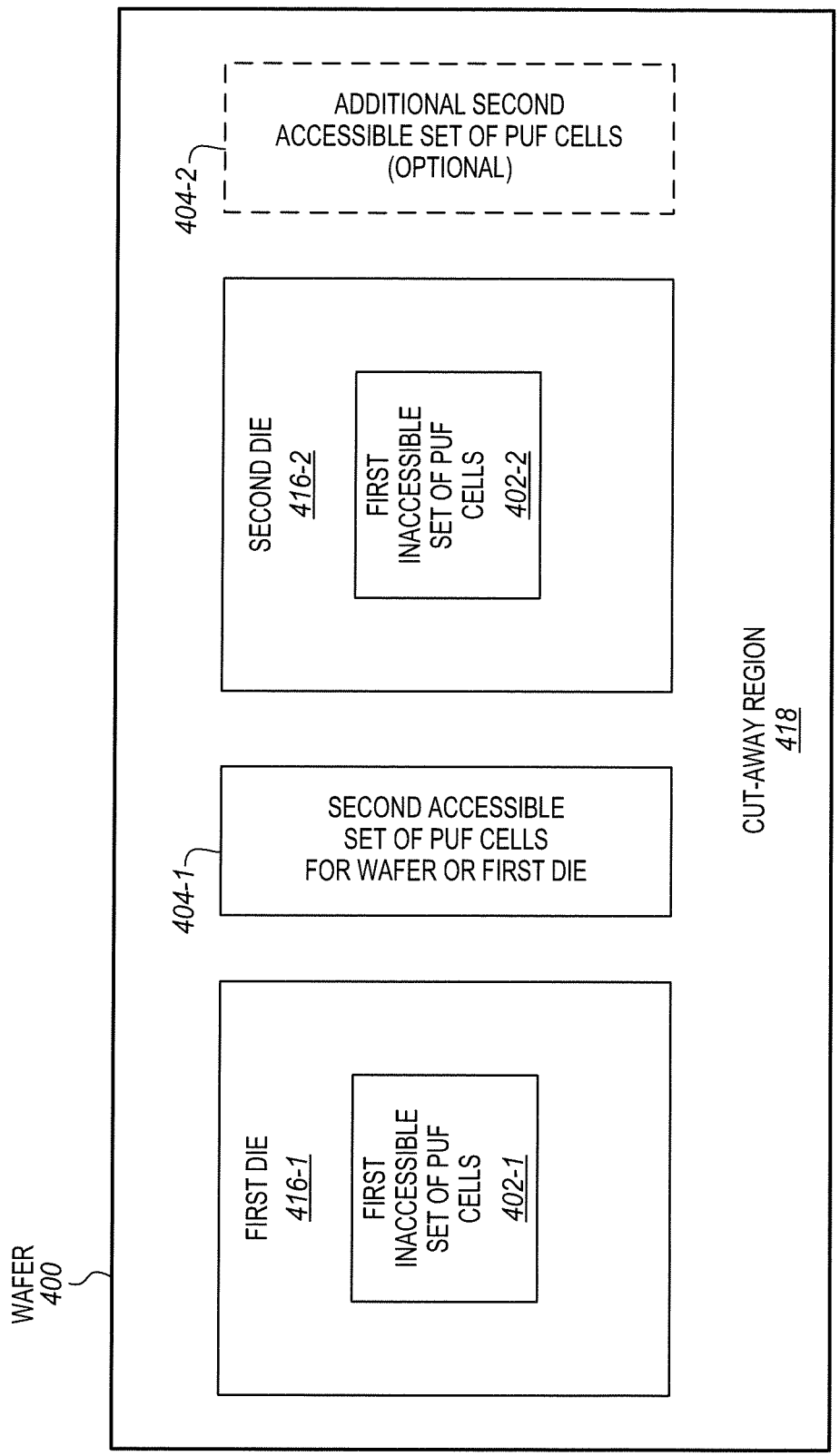
FIG. 4 is a block diagram of an embodiment of a wafer having first inaccessible sets of PUF cells each within a corresponding die and at least one second accessible set of PUF cells in a cut-away region that is to be removed during dicing.

Different embodiments of physically locating the first inaccessible and the second accessible sets of PUF cells are contemplated. FIGS. 2-4 illustrate several example embodiments, although the invention is not limited to these embodiments. These embodiments may be used in the integrated circuit 100 of FIG. 1. Alternatively, these embodiments may be used in an entirely different integrated circuit. Moreover, the integrated circuit 100 of FIG. 1 may use entirely different embodiments than those shown in these figures.

FIG. 2 is a block diagram of an embodiment of a die 200 having a first inaccessible set of PUF cells 202 and a second accessible set of PUF cells 204 in close proximity. In one embodiment, the inaccessible and accessible sets of PUF cells may be intermingled with one another within the same region of the die (e.g., at least some of the inaccessible set of PUF cells may be disposed between at least some of the accessible set of PUF cells). In another embodiment, the inaccessible and accessible sets of PUF cells may be located in adjacent or adjoining regions of the die. For example, the inaccessible set of PUF cells may be confined to a first region of the die and the second accessible set of PUF cells may be confined to a second region of the die and the first and second regions may overlap, may be adjacent to one another, or may adjoin one another. In yet another embodiment, the inaccessible and accessible sets of PUF cells may be located in proximate regions of the die. As used herein, proximate one another or located in proximate regions of the die means that both are within a region that is no more than a third a size of the die. Providing the inaccessible and accessible sets of PUF cells in the same, adjacent, or at least proximate regions of the die generally tends to make the PUF bit characteristics of the inaccessible and accessible sets of PUF cells relatively to one another.

FIG. 3 is a block diagram of an embodiment of a die 300 having a first inaccessible set of PUF cells 302 and a second accessible set of PUF cells 304 that are physically separated from and/or not proximate to one another. As used herein, the first inaccessible set of PUF cells 302 and the second accessible set of PUF cells 304 are not proximate when they are not both contained within region that is no more than a third a size of the die.

FIG. 4 is a block diagram of an embodiment of a wafer 400 having first inaccessible sets of PUF cells 402-1, 402-2 each within a corresponding die and at least one second accessible set of PUF cells 404-1 in a cut-away region 418 outside of the dice that is to be cut away or removed during dicing of the wafer. In the illustration, a first die 416-1 and a second die 416-2 are shown. The first die has within its die confines a first instance of a first inaccessible set of PUF cells 402-1. Likewise, the second die has within its die confines a second instance of a first inaccessible set of PUF cells 402-2. In the illustrated embodiment, between the first and second die, which are adjacent to one another, is a second accessible set of PUF cells. A second accessible set of PUF bits from the second accessible set of PUF cells may be accessed during wafer testing, or otherwise prior to singulation or dicing of the wafer. Thereafter, the second accessible set of PUF cells may be cut away during singulation or dicing of the wafer and discarded. The second accessible set of PUF cells is in the cut-away region, for example between dicing lines, in a die street region, in a kerf region, etc. The second accessible set of PUF cells do not appear in a final packaged die to be used in an electronic device. In one embodiment, the wafer may include a single second accessible set of PUF cells to be used for the whole wafer. In another embodiment, the wafer may include two or more second accessible sets of PUF cells. As shown, the wafer may optionally include an additional second accessible set of PUF cells 404-2. In another embodiment, each die may have a corresponding second accessible set of PUF cells. Alternatively, there may be fewer second accessible sets of PUF cells than die, or a single second accessible set of PUF cells. In one aspect, in the case of a single second accessible set of PUF cells, it may be located in a central region of the wafer so as to be more relevant for die across the wafer.

Figure 5:
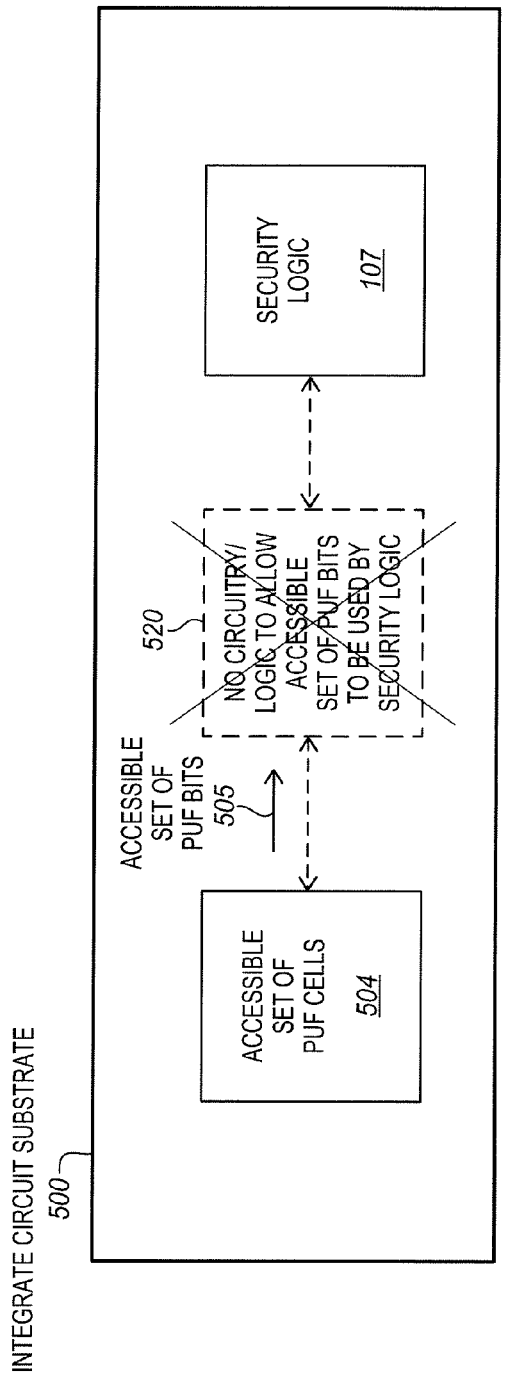
FIG. 5 is a block diagram of an embodiment of an integrated circuit substrate showing that in some embodiments an accessible set of PUF cells and/or an accessible set of PUF bits may not be used for security in the integrated circuit substrate.

FIG. 5 is a block diagram of an embodiment of an integrated circuit substrate 500 showing that in some embodiments an accessible set of PUF cells 504 and/or an accessible set of PUF bits 505 may not be used for security in the integrated circuit substrate. For example, there may be no lines, wires, or other interconnects and/or other logic to allow the accessible PUF bits to be provided to these security related components (e.g., there is no logical capability to access the accessible set of PUF bits and route them to the these security related components over internal interconnects, interfaces, buses, or the like). As previously mentioned, the accessible set of PUF cells and/or the accessible set of PUF bits are accessible through exposed or external electrical contacts of the integrated circuit. However, the integrated circuit substrate omits or lacks circuitry or other logic 520 to allow the accessible set of PUF bits to be used for security.

The accessible set of PUF bits are not provided to security logic 107. Since the accessible PUF bits can be readily obtained by external equipment, this embodiment takes a more conservative approach in which the accessible PUF bits are not used for security (e.g., are not used as secure keys or to generate or derive secure keys).

Figure 6:
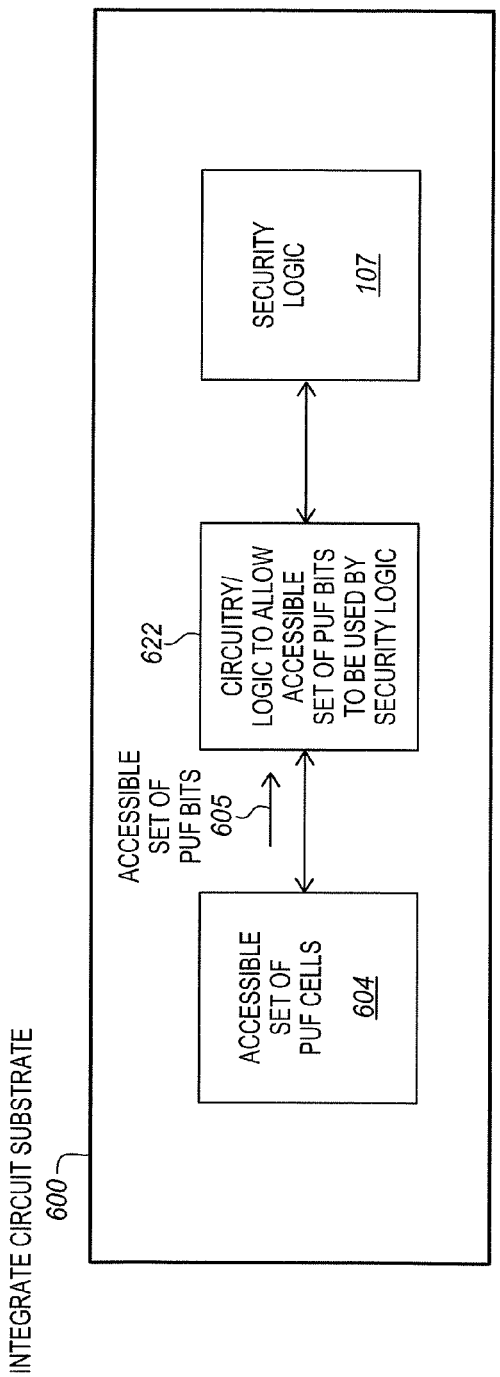
FIG. 6 is a block diagram of an embodiment of an integrated circuit substrate showing that in other embodiments an accessible set of PUF cells and/or an accessible set of PUF bits may be used for security in the integrated circuit substrate.

FIG. 6 is a block diagram of an embodiment of an integrated circuit substrate 600 showing that in other embodiments an accessible set of PUF cells 604 and/or an accessible set of PUF bits 605 may be used for certain security in the integrated circuit substrate. As before, the accessible set of PUF cells and/or the accessible set of PUF bits are accessible through exposed or external electrical contacts of the integrated circuit. In this embodiment, the integrated circuit substrate includes circuitry or other logic 622 to allow the accessible set of PUF bits to be used for security. The circuitry or other logic allows the accessible set of PUF bits to be provided to security logic 107. Although the accessible PUF bits can be readily obtained by external equipment, they may be useful for some security related features. For example, they may be used as less important secrets or secure keys, or to generate less important secure keys. As another example, the accessible set of PUF bits may be combined with other information that is more difficult to know and then used as secrets or secure keys and/or to generate secrets or secure keys. By way of example, the accessible PUF bits may be combined with a portion of a set of inaccessible PUF bits and/or bits stored in ROM memory and/or fuses.

It is to be appreciated that the components, features, and specific optional details described above for FIG. 1 may also optionally apply to any one or more of FIGS. 2-6. Moreover, the components, features, and specific optional details described above for any one or more of FIGS. 2-6 may also optionally apply to FIG. 1.

Figure 7:
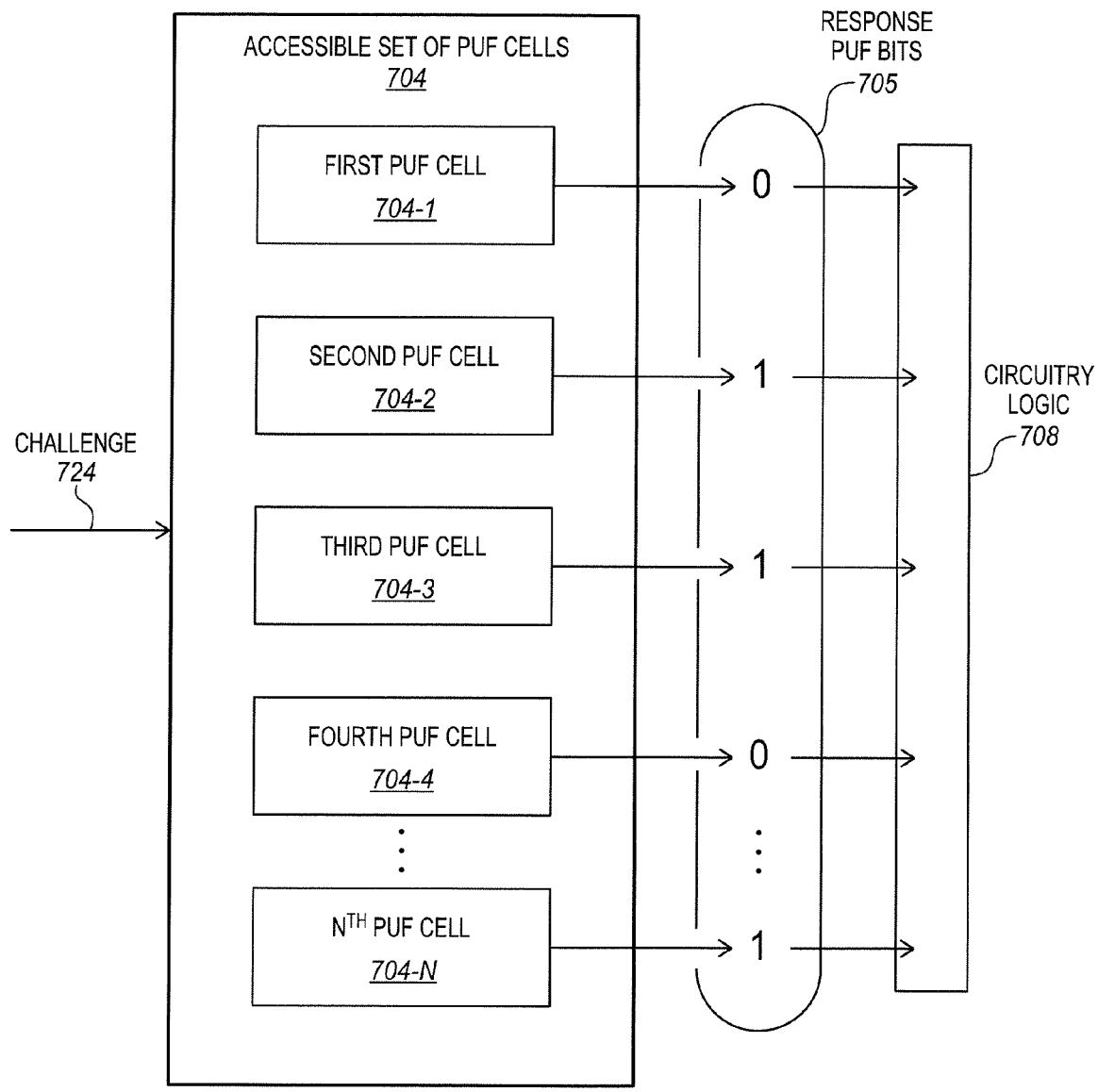
FIG. 7 is a block diagram of an example embodiment of an accessible set of PUF cells to generate an accessible set of PUF bits that are accessible through exposed and/or external electrical contacts.

FIG. 7 is a block diagram of an example embodiment of an accessible set of PUF cells 704 to generate an accessible set of PUF bits that are accessible through exposed and/or external electrical contacts. In one embodiment, the accessible set of PUF cells 704 may be used as the second accessible set of PUF cells 104 of the integrated circuit substrate of FIG. 1. Alternatively, the accessible set of PUF cells 704 may be used in an entirely different integrated circuit or substrate. Moreover, the integrated circuit substrate of FIG. 1 may include an entirely different set of accessible PUF cells.

The accessible set of PUF cells 704 include a first PUF cell 704-1, a second PUF cell 704-2, a third PUF cell 704-3, a fourth PUF cell 704-4, through an $N^{th}$ PUF cell 704-N, where N may be any desired number. In various embodiments, there may be anywhere from tens, to hundreds, to several thousand of the accessible set of PUF cells, although the scope of the invention is not limited to any particular number. Often from about 64 to 1024, or from about 128 to 512, will be sufficient, although the scope of the invention is not limited to these particular numbers. It is not required to use a number that is a power of two. In some embodiments, each of the PUF cells may be embedded within an integrated circuit substrate, for example including integrated circuitry or structures or devices formed of silicon and/or by a CMOS process.

A challenge 724 (e.g., one or more electrical signals or other stimuli) is provided to the accessible set of PUF cells. The accessible set of PUF cells provides a set of PUF bits 705 as a response. In particular, in the illustration the PUF cells provide the set of PUF bits "0110 . . . 1", in this particular example. It is noted that some types of PUF cells may not require a challenge or response but rather may provide or deliver readable values. The PUF bits are provided to circuitry or other logic 708 that is operable to make the PUF bits accessible through the exposed and/or external electrical contacts.

The response and/or the PUF bits generally tend to be substantially static. For example, when reading PUF bits from the PUF cells multiple times, typically a vast majority of the PUF bits tend to have the same binary value from one read to the next. Some PUF bits referred to as the "weaker" PUF bits may tend to flip or change binary value from one read to the next more frequently than others. For example, the aforementioned challenge may result in the PUF bits "011$\underline{0}$ . . . 1," whereas a subsequent challenge may result in the PUF bits "011$\underline{1}$ . . . 1." Notice that the underlined PUF bit has flipped from binary-0 to binary-1 from one read to another. This represents a PUF bit error. When used for security, such PUF bit errors are generally undesirable, since they may cause very different secure keys to be generated and/or derived. Accordingly, it is often desirable to be able to estimate or quantify the PUF bit error level (e.g., in order to ensure that the error correction technique is sufficient).

It is generally desirable also for the PUF bits and/or PUF cells of different integrated circuits or substrates to have sufficient entropy. Entropy measures the quality or level of randomness of generated PUF bits. When there is a high level of entropy, then the likelihood of an identical PUF bits from different sets of PUF cells is very low. For example, the PUF bits from a first set of PUF cells may be "01101," the PUF bits from a second set of PUF cells may be "10100," and the PUF bits from a third set of PUF cells may be "10111," as just one example. Notice that the sets of PUF bits are different. When there is a high level of entropy, there should be approximately equal likelihood of each bit having either a binary-0 or a binary-1, such that given enough sets of PUF bits a string of PUF bits should span all of the possible binary values. When used for security, it is generally desirable for PUF bits to be at least reasonably entropic or random, since this helps to enhance the security. By way of example, it is possible that a manufacturing process may be so tightly controlled that there is insufficient variation to provide a desired level of entropy such that a given factor may dominate the bias of the PUF bits such that they all trend toward a common or systematic value (e.g., all trend toward "10111"). This may tend to make the PUF bits more vulnerable to attack. Accordingly, it is generally desirable to be able to estimate or quantify the PUF bit entropy level (e.g., in order to monitor the level of entropy or verify that there is a sufficient level of entropy, to increase the manufacturing process variation, to guide redesign of logic, etc.).

It is contemplated that PUF bit entropy may tend to be inversely related to the maturity of a manufacturing process. For example, in the early days of a manufacturing process, when the process is relatively immature, the amount of process variation may tend to be relatively high, such that the level of PUF bit entropy may tend to be relatively higher. Over time, as the manufacturing process matures, the amount of process variation may tend to decrease (e.g., through continued efforts to tighten up the process), which in turn may tend to cause the level of PUF bit entropy to decrease. PUF bits produced by such mature manufacturing process may not have as much entropy as the PUF bits produced by the immature manufacturing processes for which the PUF bits were initially evaluated and/or designed. It is possible that at some point the manufacturing process may become too tightly controlled that there is insufficient process variation to provide the desired amount of PUF bit entropy. Advantageously, the approaches disclosed herein allow a manufacturer to evaluate the level of PUF bit entropy of manufactured integrated circuits, including over time as the manufacturing process matures, which may help to avoid a situation where the PUF bits have undesirably low entropy. This may help to ensure the security of the integrated circuits is maintained.

Figure 8:
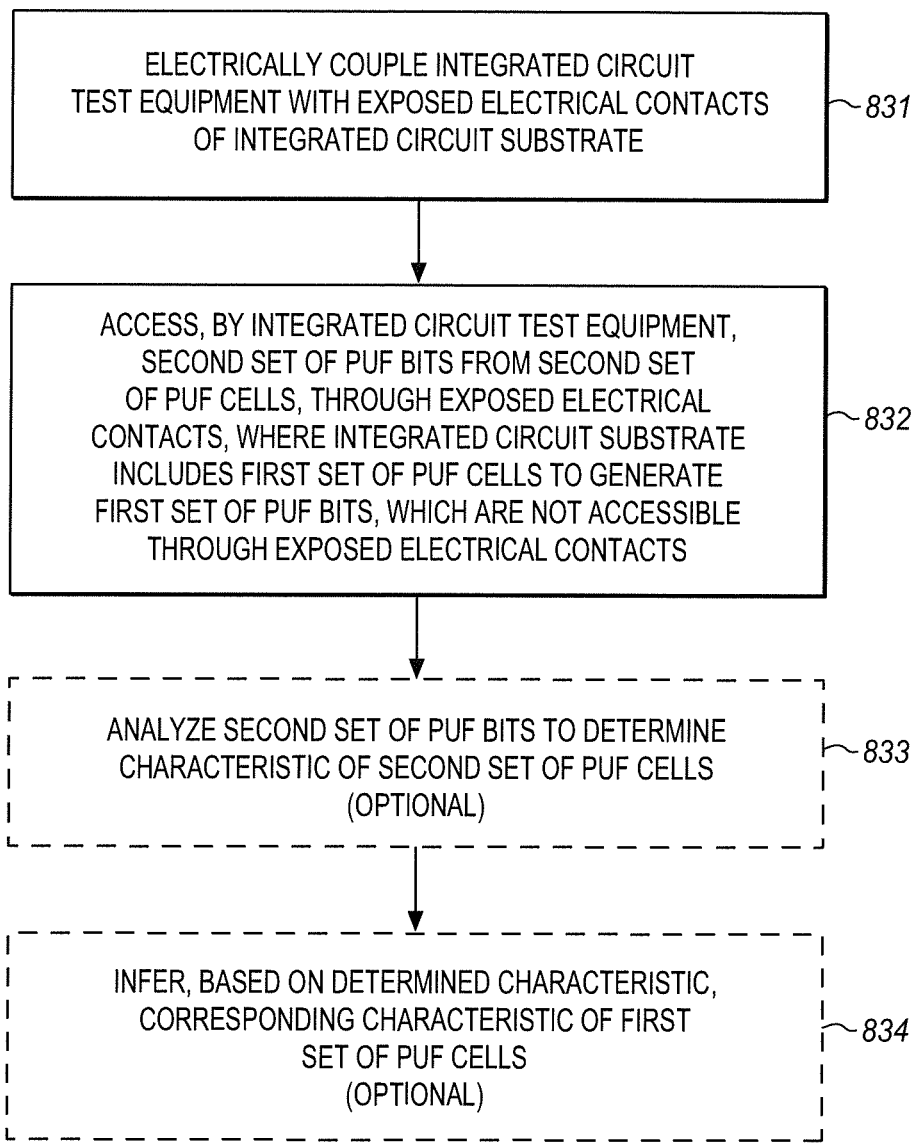
FIG. 8 is a block flow diagram of an embodiment of a method of testing integrated circuits.

FIG. 8 is a block flow diagram of an embodiment of a method 800 of testing integrated circuits. In one aspect, the method may be performed on the integrated circuit substrate of FIG. 1. Alternatively, the method may be performed on an entirely different integrated circuit substrate. Moreover, the integrated circuit substrate of FIG. 1 may be tested by entirely different methods. The features and/or details described herein for an apparatus (e.g., FIGS. 1-7) may also optionally pertain to the methods described herein (e.g., the method of FIG. 8) which are performed by and/or with an apparatus.

The method includes electrically coupling integrated circuit test equipment (e.g., a prober and tester) with a plurality of exposed electrical contacts of an integrated circuit substrate, at block 831. For example, electrical test probes of the integrated circuit test equipment (e.g., in a probe card) may be contacted with pads, bumps, or other electrical contacts of the integrated circuit.

The integrated circuit test equipment accesses a second set of PUF bits from a second set of PUF cells of the integrated circuit substrate through the exposed electrical contacts, at block 832. For example, the second set of PUF bits may be read out through the exposed electrical contacts and the electrical test probes. The integrated circuit substrate also includes a first set of PUF cells to generate a first set of PUF bits that are not accessible through the exposed electrical contacts. In some embodiments, the second set of PUF bits may be accessed from a debug enabled region but the first set of PUF cells may be within a debug disabled region or at least a more restricted debug region.

The second set of PUF bits are optionally analyzed, along with other sets of PUF bits, to determine a characteristic of the second set of PUF cells, at block 833. In some embodiments, PUF bits from at least a hundred, at least a thousand, or more different PUF cells or integrated circuits may be analyzed. In some embodiments, the characteristic may be one or more of a PUF bit error level and a PUF bit entropy level.

A corresponding characteristic of the first set of PUF cells is optionally estimated or inferred, based on the determined characteristic for the second set of PUF cells, at block 834. Advantageously, the characteristic of the first set of PUF cells may be estimated or inferred without ever needing to know the first set of PUF bits. This helps to enhance the security provided by the first set of PUF cells and/or the first set of PUF bits, as well as helping to reduce the responsibilities and/or liabilities of the manufacturer.

Figure 9:
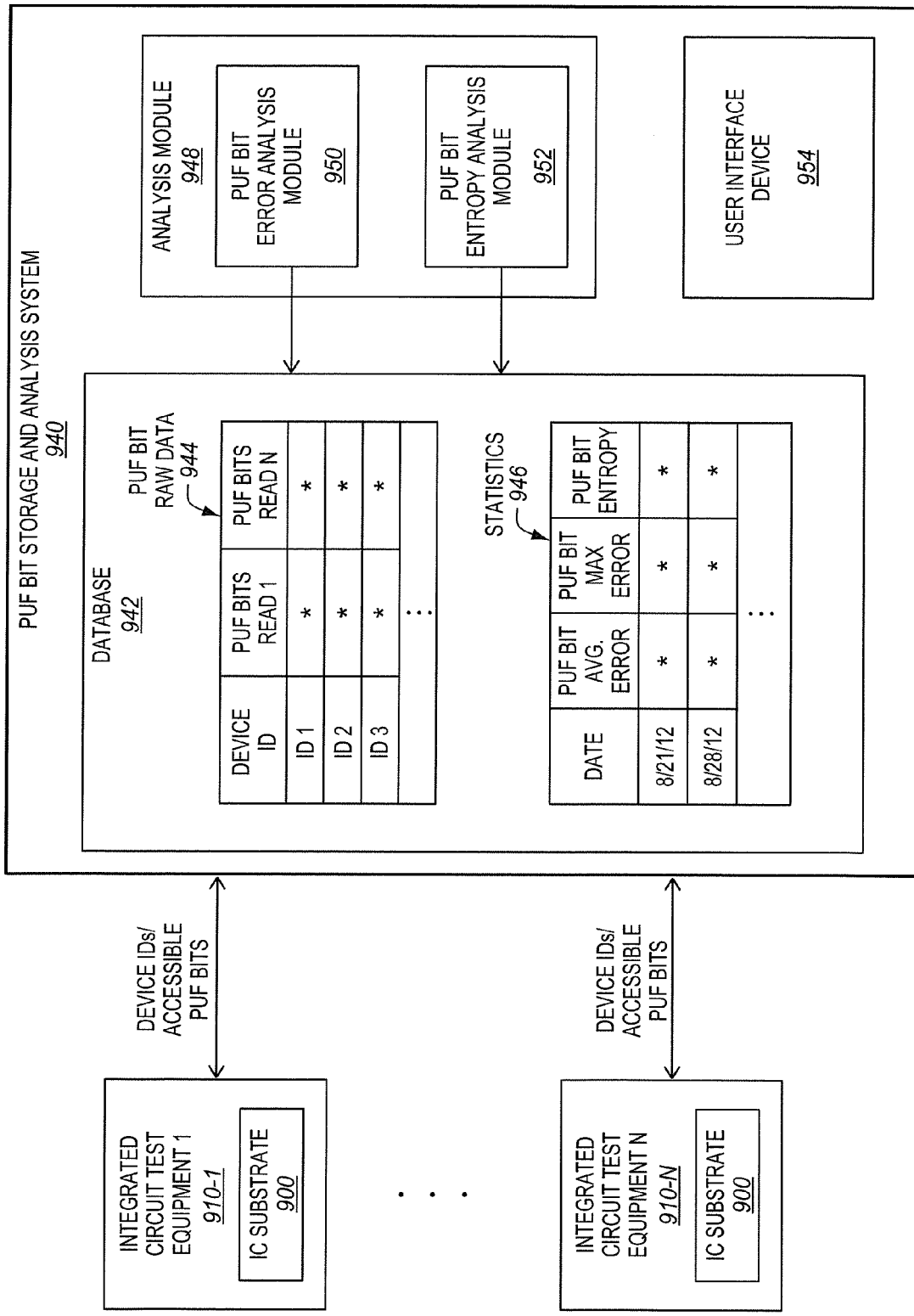
FIG. 9 is a block diagram of a PUF bit storage and analysis system coupled with a plurality of integrated circuit test equipment.

FIG. 9 is a block diagram of a PUF bit storage and analysis system 940 coupled with, or otherwise in communication with, a plurality of integrated circuit test equipment 910-1 through 910-N. By way of example, the integrated circuit test equipment may represent potentially geographically distributed probers and testers or other equipment. Each of the integrated circuit test equipment tests multiple integrated circuit substrates 900. The integrated circuit substrates have device identifiers (IDs), such as unit level traceability (ULT) values. The integrated circuit test equipment provides device IDs and corresponding accessible PUF bits read from those devices to the PUF bit storage and analysis system.

The PUF bit storage and analysis system includes a database 942. The database includes a PUF bit raw data database 944. By way of example, the PUF bit raw data database may store PUF bits read on one or potentially multiple reads each from a number of integrated circuit substrates having different device IDs. In some cases, PUF bits for hundreds, thousands, or more different integrated circuit substrates may be stored. If desired, PUF bits read under different conditions (temperature, voltage, etc.) may be stored. In some embodiments, the database may only store PUF bits read from accessible PUFs but not from inaccessible PUFs. As previously described above, the manufacturer does not need to know the values of the inaccessible PUF bits, and there are advantages to the manufacturer not knowing the values of the inaccessible PUF bits (e.g., to reduce the risk of a security breach and/or to limit the liabilities of the manufacturer).

The PUF bit storage and analysis system includes an analysis module 948 coupled, or otherwise in communication, with the database. In the illustrated embodiment, the analysis module includes a PUF bit error analysis module 950 and a PUF bit entropy analysis module 952. The PUF bit error analysis module is operable to analyze some or all of the PUF bits from the database to determine a PUF bit error level. The PUF bit error level is determinable either from multiple reads of the same integrated circuit substrate (e.g., the same device ID), but generally will be determined based on reads of multiple, different integrated circuit substrates/device IDs. The PUF bit entropy analysis module is operable to analyze some or all of the PUF bits from the database to determine a PUF bit entropy level. The PUF bit entropy level is determinable from PUF bits from different devices. In one aspect, intra-distance and/or inter-distance metrics may be calculated. The intra-distance represents the distance between two responses when the same challenge is applied twice to the same PUF. The intra-distance metric may measure the Hamming distance between multiple reads of PUF bits on a single integrated circuit. The intra-distance may help to quantify the reliability of the PUF cells and the error rate of the PUF bits. The inter-distance represents the distance between two responses resulting from applying the same challenge to two different instances of a PUF. The inter-distance measures the Hamming distance between two measurements of PUF collected from different devices. Inter-distance assesses the uniqueness of PUF and generally should be reasonably close to half of the PUF length.

The analysis module stores analysis results or statistics in a statistics database 946. As shown in the illustrated embodiment, analysis results or statistics may be generated for different dates in order to allow trends to be monitored or detected. A few illustrative examples of analysis results or statistics include, but are not limited to, PUF bit average error level for a given time frame, PUF bit maximum error level for a given time frame, PUF bit minimum error level for a given time frame, PUF bit entropy for a given time frame, PUF bit minimum and/or maximum entropy, etc.

A user interface device 954 is also included to interface with a user. The user interface device may include one or more of a keyboard, a screen, a printer, a network connection, a mouse, a command line interface, etc.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 10A is a block diagram illustrating both an exemplary in-order pipeline and an exemplary register renaming, out-of-order issue/execution pipeline according to embodiments of the invention. FIG. 10B is a block diagram illustrating both an exemplary embodiment of an in-order architecture core and an exemplary register renaming, out-of-order issue/execution architecture core to be included in a processor according to embodiments of the invention. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1058 comprises a vector registers unit, a write mask registers unit, and a scalar registers unit. These register units may provide architectural vector registers, vector mask registers, and general purpose registers. The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1090 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 11B:
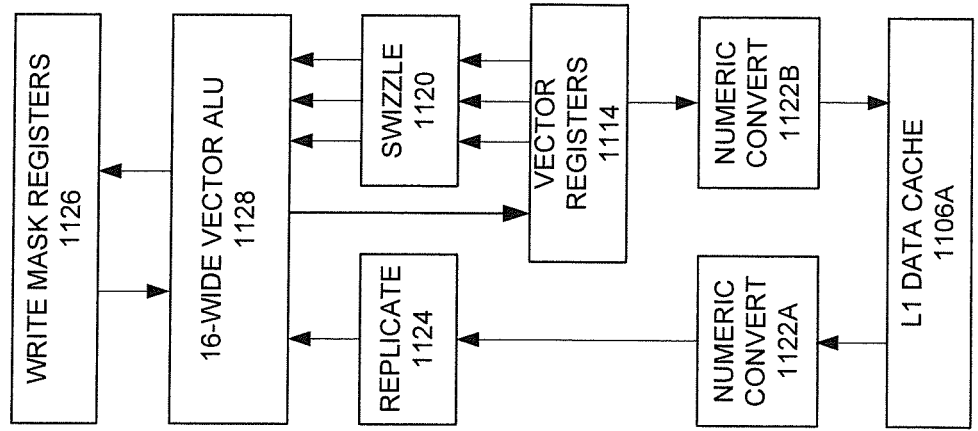
FIG. 11B is an expanded view of part of the processor core in FIG. 11A according to embodiments of the invention.
Figure 11A:
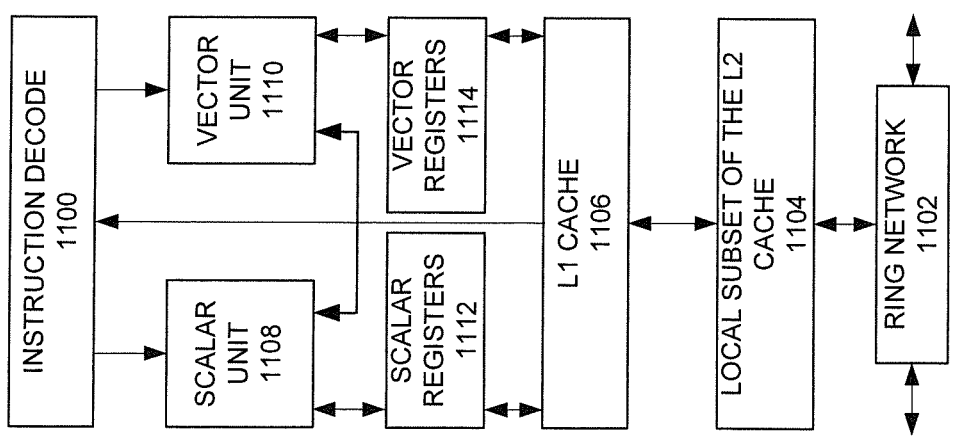
FIG. 11A is a block diagram of a single processor core, along with its connection to the on-die interconnect network and with its local subset of the Level 2 (L2) cache, according to embodiments of the invention.

FIGS. 11A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to embodiments of the invention. In one embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 1112 and vector registers 1114) and data transferred between them is written to memory and then read back in from a level 1 (L1) cache 1106, alternative embodiments of the invention may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to embodiments of the invention. FIG. 11B includes an L1 data cache 1106A part of the L1 cache 1104, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input. Write mask registers 1126 allow predicating resulting vector writes.

Processor with Integrated Memory Controller and Graphics

Figure 12:
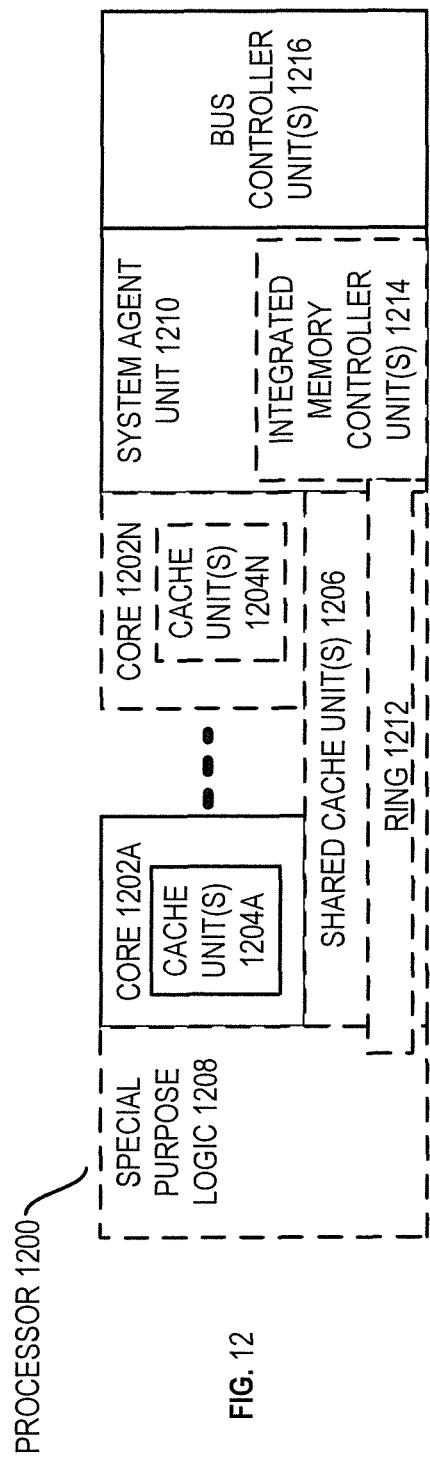
FIG. 12 is a block diagram of a processor that may have more than one core, may have an integrated memory controller, and may have integrated graphics according to embodiments of the invention.

FIG. 12 is a block diagram of a processor 1200 that may have more than one core, may have an integrated memory controller, and may have integrated graphics according to embodiments of the invention. The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A-N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the integrated graphics logic 1208, the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202-A-N.

In some embodiments, one or more of the cores 1202A-N are capable of multi-threading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

Exemplary Computer Architectures

FIGS. 13-16 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
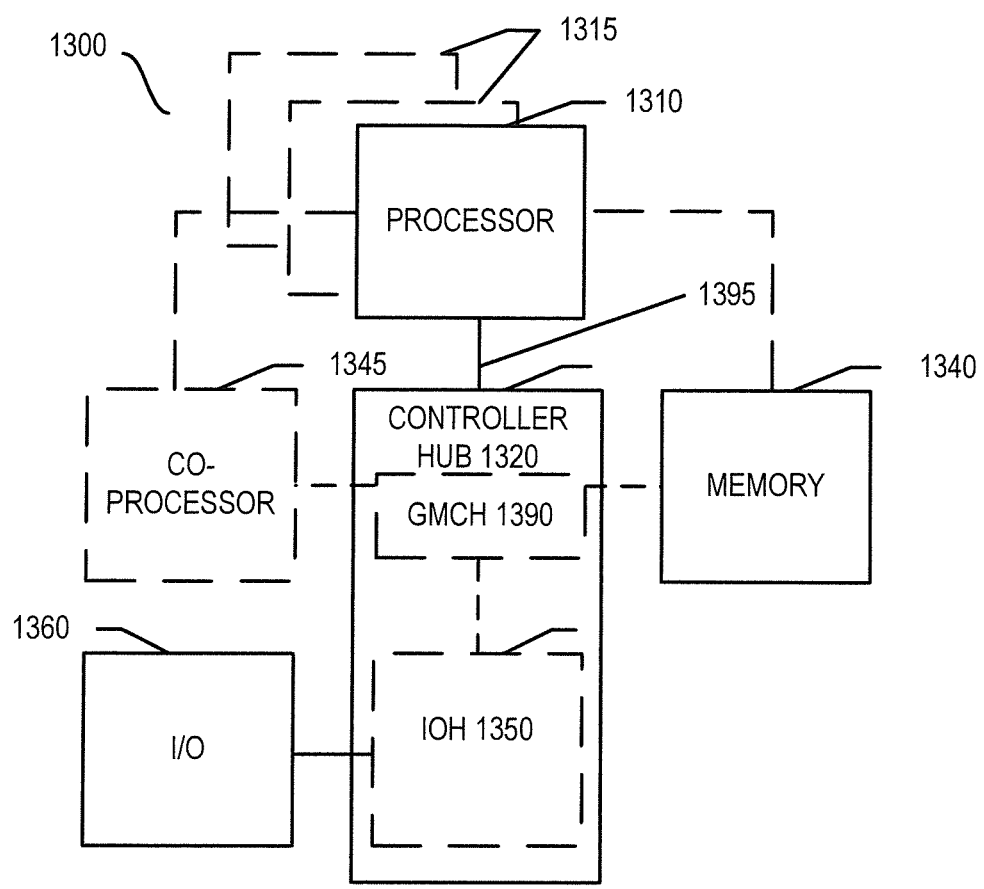
FIG. 13 shown is a block diagram of a system 1300 in accordance with one embodiment of the present invention.

Referring now to FIG. 13, shown is a block diagram of a system 1300 in accordance with one embodiment of the present invention. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 is couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface such as QuickPath Interconnect (QPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
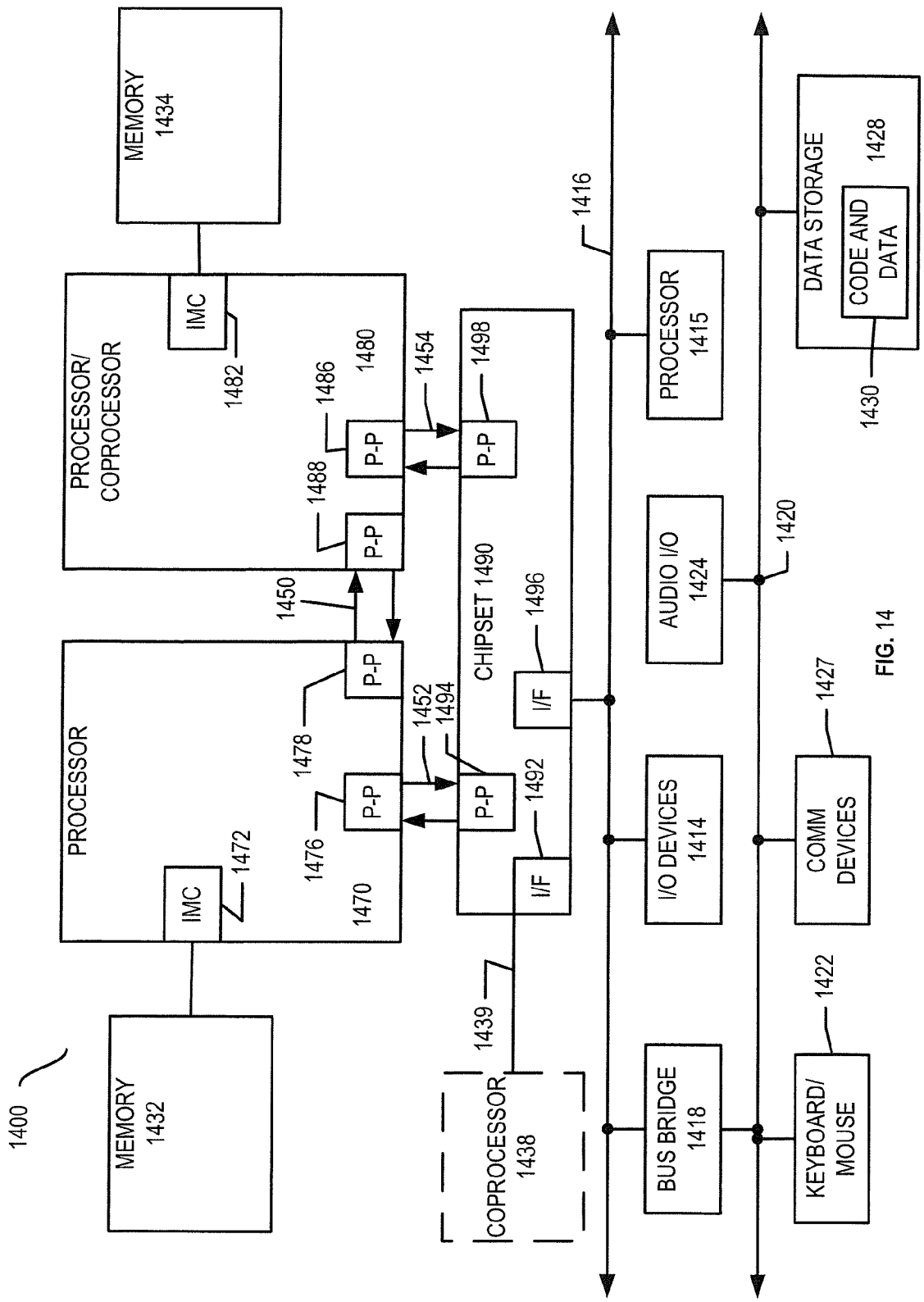
FIG. 14 shown is a block diagram of a first more specific exemplary system 1400 in accordance with an embodiment of the present invention.

Referring now to FIG. 14, shown is a block diagram of a first more specific exemplary system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In one embodiment of the invention, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1439. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
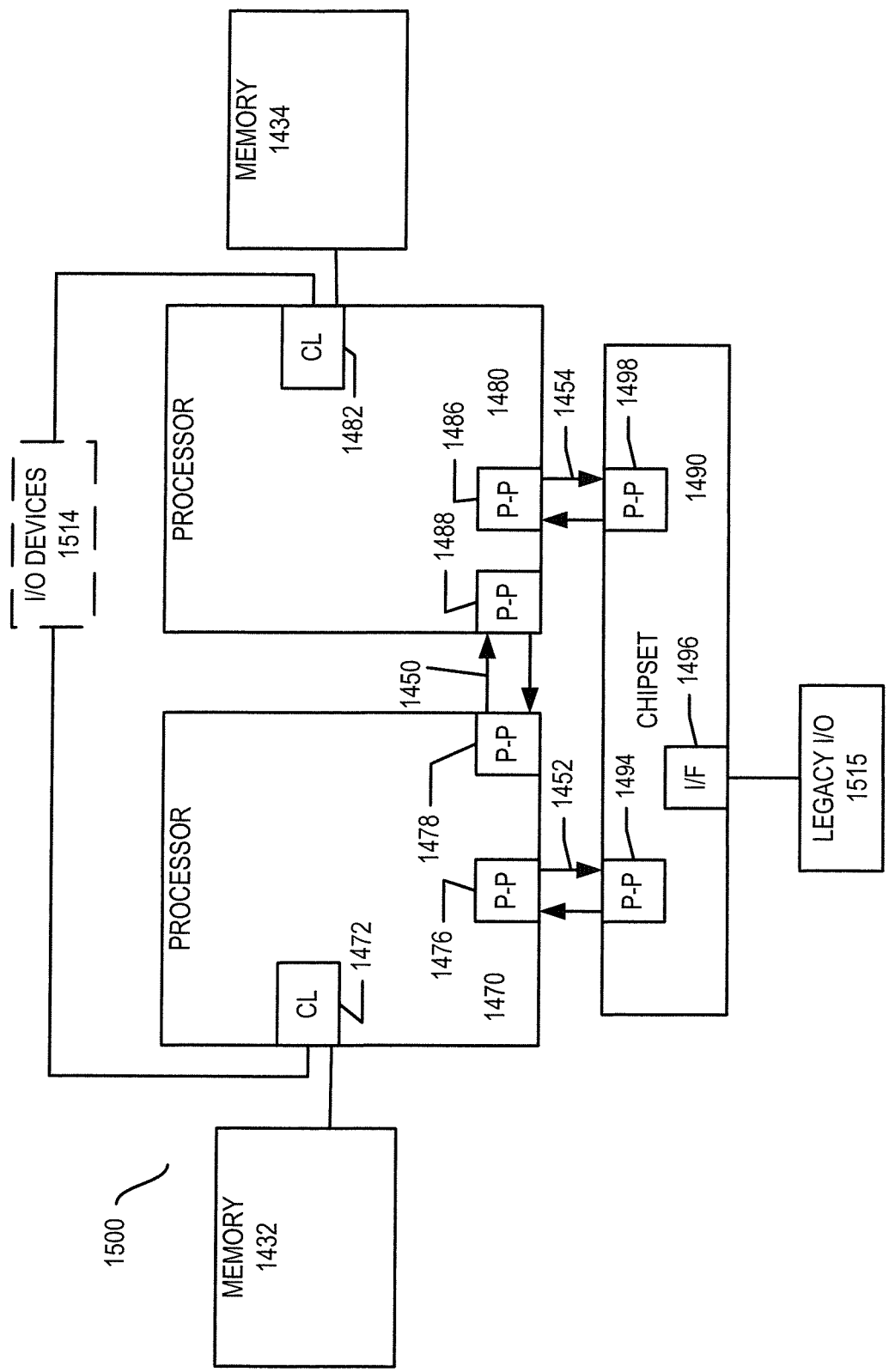
FIG. 15 shown is a block diagram of a second more specific exemplary system 1500 in accordance with an embodiment of the present invention.

Referring now to FIG. 15, shown is a block diagram of a second more specific exemplary system 1500 in accordance with an embodiment of the present invention. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1472 and 1482, respectively. Thus, the CL 1472, 1482 include integrated memory controller units and include I/O control logic. FIG. 15 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

Figure 16:
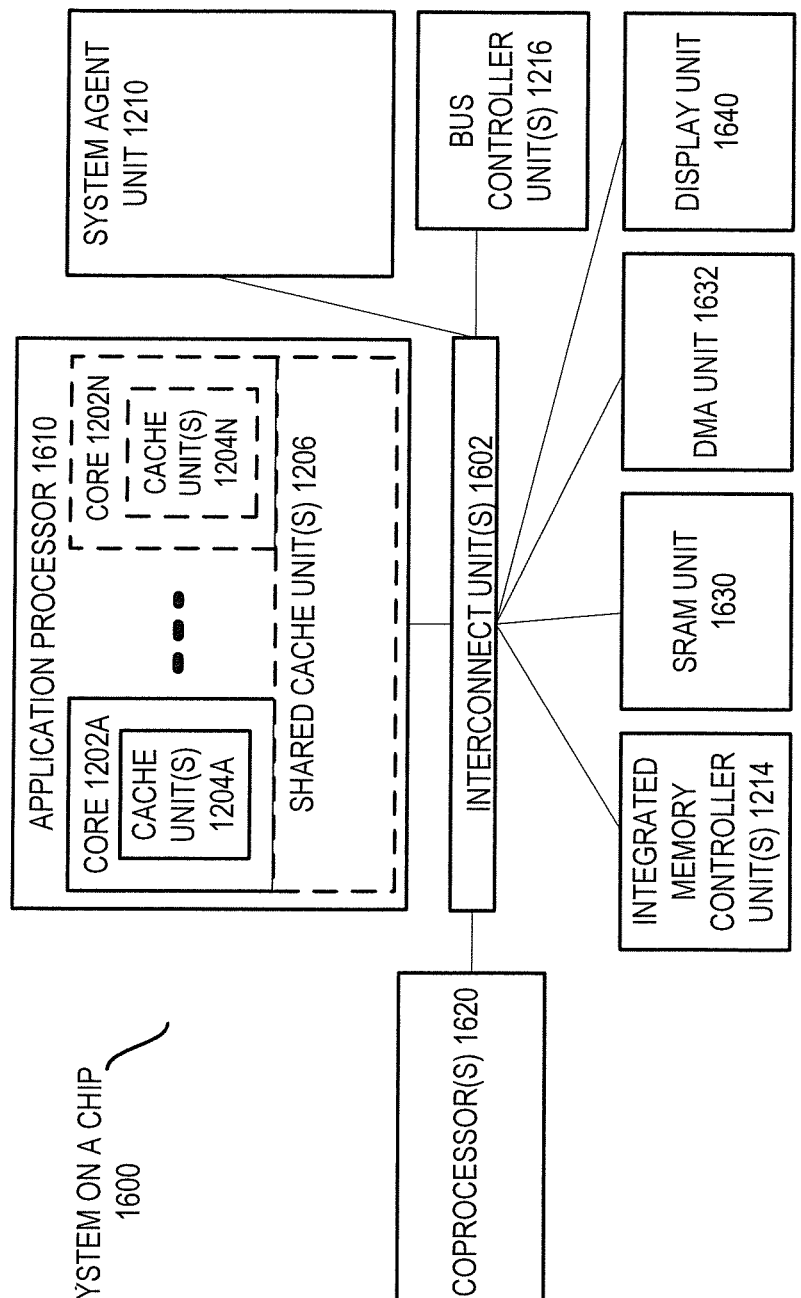
FIG. 16, shown is a block diagram of a SoC in accordance with an embodiment of the present invention.

Referring now to FIG. 16, shown is a block diagram of a SoC 1600 in accordance with an embodiment of the present invention. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 202A-N and shared cache unit(s) 1206; a system agent unit 1210; a bus controller unit(s) 1216; an integrated memory controller unit(s) 1214; a set or one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 17 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

In the description and claims, the terms "coupled" and "connected," along with their derivatives, may be used. It should be understood that these terms are not intended as synonyms for each other. Rather, in particular embodiments, "connected" may be used to indicate that two or more elements or components are in direct physical or electrical contact with each other. "Coupled" may mean that two or more elements are in direct physical or electrical contact. However, "coupled" may also mean that two or more elements are not in direct contact with each other, but yet still co-operate or interact with each other.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known circuits, structures, devices, and operations have been shown in block diagram form or without detail in order to avoid obscuring the understanding of the description. It will also be appreciated, by one skilled in the art, that modifications may be made to the embodiments disclosed herein, such as, for example, to the configurations, functions, and manner of operation of the embodiments. Where considered appropriate, reference numerals or terminal portions of reference numerals have been repeated among the figures to indicate corresponding or analogous elements, which may optionally have similar characteristics.

Various operations and methods have been described. Some of the methods have been described in a basic form in the flow diagrams, but operations may optionally be added to and/or removed from the methods. In addition, while the flow diagrams show a particular order of the operations according to example embodiments, it is to be understood that that particular order is exemplary. Alternate embodiments may optionally perform the operations in different order, combine certain operations, overlap certain operations, etc.

One or more embodiments include an article of manufacture (e.g., a computer program product) that includes a machine-accessible and/or machine-readable medium. The medium may include a mechanism that provides, for example stores or transmits, information in a form that is accessible and/or readable by the machine. The machine-accessible and/or machine-readable medium may provide, or have stored thereon, one or more or a sequence of instructions and/or data structures that if executed by a machine causes or results in the machine performing, and/or causes the machine to perform, one or more or a portion of the operations or methods or the techniques shown in the figures disclosed herein.

In one embodiment, the machine-readable medium may include a tangible non-transitory machine-readable storage media. For example, the tangible non-transitory machine-readable storage media may include a floppy diskette, an optical storage medium, an optical disk, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, or a combinations thereof. The tangible medium may include one or more solid or tangible physical materials, such as, for example, a semiconductor material, a phase change material, a magnetic material, etc.

Examples of suitable machines include, but are not limited to, computer systems, desktops, laptops, notebooks, netbooks, nettops, Mobile Internet devices (MIDs), network devices, routers, switches, cellular phones, media players, and other electronic devices having one or more processors or other instruction execution devices. Such electronic devices typically include one or more processors coupled with one or more other components, such as one or more storage devices (non-transitory machine-readable storage media), user input/output devices (e.g., a keyboard, a touchscreen, and/or a display), and/or network connections. The coupling of the processors and other components is typically through one or more busses and bridges (also termed bus controllers).

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

The following clauses and/or examples pertain to further embodiments. Specifics in the clauses and/or examples may be used anywhere in one or more embodiments.

In one embodiment, a first integrated circuit substrate includes a plurality of exposed electrical contacts. The first integrated circuit substrate also includes an inaccessible set of Physically Unclonable Function (PUF) cells to generate an inaccessible set of PUF bits that are not accessible through the exposed electrical contacts. The first integrated circuit substrate also includes an accessible set of PUF cells to generate an accessible set of PUF bits that are accessible through the exposed electrical contacts.

Embodiments include any of the above first integrated circuit substrates further including logic to allow the accessible set of PUF bits to be accessible through the exposed electrical contacts, and where there is no logic to allow the inaccessible set of PUF bits to be accessible through the exposed electrical contacts.

Embodiments include any of the above first integrated circuit substrates where the inaccessible set of PUF bits are to be provided to security logic for use in security and the accessible set of PUF bits are not to be provided to the security logic for use in security.

Embodiments include any of the above first integrated circuit substrates further including: security logic; logic to provide the inaccessible set of PUF bits to the security logic, and where there is no logic to provide the accessible set of PUF bits to the security logic.

Embodiments include any of the above first integrated circuit substrates where the accessible set of PUF cells are within a region more enabled for debug than a region having the inaccessible set of PUF cells.

Embodiments include any of the above first integrated circuit substrates where the exposed electrical contacts comprise at least one of pads, bumps, solder, and pins.

Embodiments include any of the above first integrated circuit substrates where the integrated circuit substrate includes a wafer, where the inaccessible set of PUF cells is within a die, and where the accessible set of PUF cells within a cut-away region of the wafer that is to be removed during dicing.

Embodiments include the first integrated circuit substrate where the integrated circuit substrate includes a die, where the inaccessible and accessible sets of PUF cells are proximate one another on the die.

Embodiments include the first integrated circuit substrate where the integrated circuit substrate includes a die, and where the inaccessible and accessible sets of PUF cells are not proximate one another on the die.

In one embodiment, a first method includes electrically coupling integrated circuit test equipment with a plurality of exposed electrical contacts of an integrated circuit substrate. The first method also includes accessing, by the integrated circuit test equipment, a second set of PUF bits from a second set of PUF cells, through the exposed electrical contacts. The integrated circuit substrate includes a first set of PUF cells to generate a first set of PUF bits, which are not accessible through the exposed electrical contacts.

Embodiments include the above first method further including: analyzing the second set of PUF bits to determine a characteristic of the second set of PUF cells; and inferring, based on the determined characteristic, a corresponding characteristic of the first set of PUF cells.

Embodiments include the above first method where the characteristic includes at least one of a PUF bit error level and a PUF bit entropy level.

Embodiments include any of the above first methods where analyzing includes analyzing at least a hundred sets of PUF bits from at least a hundred different integrated circuit substrates.

Embodiments include any of the above first methods where accessing includes accessing the second set of PUF bits from the second set of PUF cells that are in a region more enabled for debug than a region having the first set of PUF cells.

Embodiments include any of the above first methods further including removing the first set of PUF cells by dicing.

In one embodiment, an apparatus is configured or operable to perform any of the above first methods.

In one embodiment, a first system includes an interconnect and a processor coupled with the interconnect. The processor includes a plurality of exposed electrical contacts. The processor also includes an inaccessible set of PUF cells to generate an inaccessible set of PUF bits that are not accessible through the exposed electrical contacts. The processor also includes an accessible set of PUF cells to generate an accessible set of PUF bits that are accessible through the exposed electrical contacts. The system also includes a dynamic random access memory (DRAM) coupled with the interconnect. The system also includes a network interface coupled with the interconnect. The network interface is to transmit encrypted data, which has been encrypted with a secure key that is based on the inaccessible set of PUF bits, to a network.

Embodiments include the first system in which the accessible set of PUF cells are within a region more enabled for debug than a region having the inaccessible set of PUF cells.

Embodiments include either of the two above first systems where the accessible set of PUF bits are not to be provided to security logic.

In one embodiment, a second integrated circuit substrate includes a plurality of exposed electrical contacts. The second integrated circuit substrate also includes a first set of bit generation logic to generate a first inaccessible set of bits that are not accessible through the exposed electrical contacts. The second integrated circuit substrate also includes a second set of bit generation logic to generate a second accessible set of bits that are accessible through the exposed electrical contacts. It is impractical to replicate the first and second sets of bit generation logic, the first and second sets of bits are to be substantially static, and the first and second sets of bits are to have values that depend at least in part on process variations experienced during manufacture of the integrated circuit.

Embodiments include the second integrated circuit substrate in which the second set of bit generation logic is within a region that is more enabled for debug than a region having the first set of bit generation logic.

Embodiments include either of the above two second integrated circuit substrates in which the first inaccessible set of PUF bits are to be provided to security logic and the second accessible set of PUF bits are not to be provided to the security logic.

What is claimed is:

1. An integrated circuit substrate comprising:
a plurality of exposed electrical contacts;
an inaccessible set of Physically Unclonable Function (PUF) cells to generate an inaccessible set of PUF bits that are not accessible through the exposed electrical contacts;
an accessible set of PUF cells to generate an accessible set of PUF bits that are accessible through the exposed electrical contacts;

security logic; and logic to provide the inaccessible set of PUF bits to the security logic, and wherein there is no logic to provide the accessible set of PUF bits to the security logic.

2. The integrated circuit substrate of claim 1, further comprising logic to allow the accessible set of PUF bits to be accessible through the exposed electrical contacts, and wherein there is no logic to allow the inaccessible set of PUF bits to be accessible through the exposed electrical contacts.

3. The integrated circuit substrate of claim 1, wherein the integrated circuit substrate comprises a die, wherein the inaccessible and accessible sets of PUF cells are proximate one another on the die.

4. The integrated circuit substrate of claim 1, wherein the integrated circuit substrate comprises a die, and wherein the inaccessible and accessible sets of PUF cells are not proximate one another on the die.

5. The integrated circuit substrate of claim 1, wherein the exposed electrical contacts comprise at least one of pads, bumps, solder, and pins.

6. An integrated circuit substrate comprising:
a plurality of exposed electrical contacts;
an inaccessible set of Physically Unclonable Function (PUF) cells to generate an inaccessible set of PUF bits that are not accessible through the exposed electrical contacts; and
an accessible set of PUF cells to generate an accessible set of PUF bits that are accessible through the exposed electrical contacts,
wherein the accessible set of PUF cells are within a region more enabled for debug than a region having the inaccessible set of PUF cells.

7. The integrated circuit substrate of claim 6, wherein the inaccessible set of PUF bits are to be provided to security logic for use in security and the accessible set of PUF bits are not to be provided to the security logic for use in security.

8. An integrated circuit substrate comprising:
a plurality of exposed electrical contacts;
an inaccessible set of Physically Unclonable Function (PUF) cells to generate an inaccessible set of PUF bits that are not accessible through the exposed electrical contacts; and
an accessible set of PUF cells to generate an accessible set of PUF bits that are accessible through the exposed electrical contacts,
wherein the integrated circuit substrate comprises a wafer, wherein the inaccessible set of PUF cells is within a die, and wherein the accessible set of PUF cells is within a cut-away region of the wafer that is to be removed during dicing.

9. A method comprising:
electrically coupling an integrated circuit test equipment with a plurality of exposed electrical contacts of an integrated circuit substrate;
accessing, by the integrated circuit test equipment, a second set of PUF bits from a second set of PUF cells, through the exposed electrical contacts,
wherein the integrated circuit substrate includes a first set of PUF cells to generate a first set of PUF bits, which are not accessible through the exposed electrical contacts, and
wherein accessing comprises accessing the second set of PUF bits from the second set of PUF cells that are in a region more enabled for debug than a region having the first set of PUF cells.

10. The method of claim 9, further comprising:
analyzing the second set of PUF bits to determine a characteristic of the second set of PUF cells; and
inferring, based on the determined characteristic, a corresponding characteristic of the first set of PUF cells.

11. The method of claim 10, wherein the characteristic comprises at least one of a PUF bit error level and a PUF bit entropy level.

12. The method of claim 10, wherein analyzing comprises analyzing at least a hundred sets of PUF bits from at least a hundred different integrated circuit substrates.

13. The method of claim 9, further comprising removing the first set of PUF cells by dicing.

14. A system comprising:
an interconnect;
a processor coupled with the interconnect, the processor comprising:
a plurality of exposed electrical contacts;
an inaccessible set of PUF cells to generate an inaccessible set of PUF bits that are not accessible through the exposed electrical contacts; and
an accessible set of PUF cells to generate an accessible set of PUF bits that are accessible through the exposed electrical contacts;
a dynamic random access memory (DRAM) coupled with the interconnect;
a network interface coupled with the interconnect, the network interface to transmit encrypted data, which has been encrypted with a secure key that is based on the inaccessible set of PUF bits, to a network.

15. The system of claim 14, wherein the accessible set of PUF cells are within a region more enabled for debug than a region having the inaccessible set of PUF cells.

16. The system of claim 14, wherein the accessible set of PUF bits are not to be provided to security logic.

17. An integrated circuit substrate comprising:
a plurality of exposed electrical contacts;
a first set of bit generation logic to generate a first inaccessible set of bits that are not accessible through the exposed electrical contacts; and
a second set of bit generation logic to generate a second accessible set of bits that are accessible through the exposed electrical contacts,
wherein it is impractical to replicate the first and second sets of bit generation logic,
wherein the first and second sets of bits are to be substantially static, and
wherein the first and second sets of bits are to have values that depend at least in part on process variations experienced during manufacture of the integrated circuit substrate,
wherein the second set of bit generation logic is within a region that is more enabled for debug than a region having the first set of bit generation logic.

18. An integrated circuit substrate comprising:
a plurality of exposed electrical contacts;
a first set of bit generation logic to generate a first inaccessible set of bits that are not accessible through the exposed electrical contacts; and
a second set of bit generation logic to generate a second accessible set of bits that are accessible through the exposed electrical contacts,
wherein it is impractical to replicate the first and second sets of bit generation logic,
wherein the first and second sets of bits are to be substantially static, and wherein the first and second sets of bits are to have values that depend at least in part on process variations experienced during manufacture of the integrated circuit substrate, wherein the first inaccessible set of bit are to be provided to security logic and the second accessible set of bits are not to be provided to the security logic.

* * * * *